United States Patent
Matsuda et al.

(10) Patent No.: US 7,395,870 B2
(45) Date of Patent: Jul. 8, 2008

(54) CONSTRUCTION MACHINE WITH FUEL USE INDICATION

(75) Inventors: Mitsunori Matsuda, Hirakata (JP); Kouji Hoshi, Hirakata (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 10/919,481

(22) Filed: Aug. 17, 2004

(65) Prior Publication Data

US 2005/0150142 A1    Jul. 14, 2005

(30) Foreign Application Priority Data

Aug. 19, 2003  (JP)  ............................. 2003-295035
May 31, 2004  (JP)  ............................. 2004-160674

(51) Int. Cl.
*A01B 71/02* (2006.01)
(52) U.S. Cl. ................................. 172/2; 37/348; 701/50
(58) Field of Classification Search ............... 172/2, 172/3, 6, 9; 37/348, 382; 701/50
See application file for complete search history.

(56) References Cited

U.S. PATENT DOCUMENTS

| | | | | |
|---|---|---|---|---|
| 2,653,197 | A | * | 9/1953 | Kawecki et al. .......... 200/61.87 |
| 6,167,337 | A | * | 12/2000 | Haack et al. .................. 701/50 |
| 6,185,496 | B1 | * | 2/2001 | Matsuno ....................... 701/70 |
| 6,499,550 | B2 | * | 12/2002 | Matsuda et al. ............... 180/90 |
| 6,766,231 | B2 | * | 7/2004 | Nakagawa et al. ............ 701/29 |
| 2002/0043414 | A1 | * | 4/2002 | Matsuda et al. ............... 180/90 |

FOREIGN PATENT DOCUMENTS

| | | |
|---|---|---|
| EP | 0 990 740 A1 | 4/2000 |
| EP | 1 342 853 A1 | 9/2003 |
| JP | 59-98935 | 6/1984 |
| JP | 6-264476 | 9/1994 |
| JP | 8-49262 | 2/1996 |
| JP | 11-286971 | 10/1999 |
| JP | 2001-11901 | 1/2001 |
| JP | 2002-23791 | 1/2002 |
| JP | 2002-275949 | 9/2002 |
| JP | 2002-285890 | 10/2002 |

OTHER PUBLICATIONS

SU 872668 Ki I Avtomatiki Im Khkhu Sezda Hitachi Construction Machinery Co., Ltd.
UK Combined Search and Examination Report dated Oct. 26, 2006.

* cited by examiner

Primary Examiner—Gary S Hartmann
(74) Attorney, Agent, or Firm—Kratz, Quintos & Hanson, LLP

(57) ABSTRACT

To provide a construction machine capable of encouraging an operator to perform the driving and the operation for enhancing fuel efficiency. The construction machine includes information providing means 30 to notify the operator of the information such as the operation and/or an operational method or the like to enhance the fuel efficiency. The present construction machine provides the information by monitor display on a monitor screens 26 that is provided in an operator's cabin 11. When operating machine levers 19 and 20 are positioned at a neutral position, if an engine 40 has the idle revolution number not less than a predetermined time, the information providing means 30 provides the information such as the operation or the like to enhance the fuel efficiency.

11 Claims, 9 Drawing Sheets

CONSTRUCTION MACHINE WITH FUEL USE INDICATION

BACKGROUND OF THE INVENTION

1. Field of the Invention

The present invention relates to a construction machine such as a hydraulic excavator or the like.

2. Description of the Related Art

For a construction machine such as a hydraulic excavator or the like, it is preferable that energy saving is carried out upon traveling and performing various operations. Therefore, when real fuel, efficiency does not attain target fuel efficiency, a conventional construction machine may be switched to energy saving operation (for example, refer to Japanese Patent Laid-open Publication No. 2002-285890 (pp. 3-4, FIG. 1)).

In other words, the construction machine described in the above-described patent document calculates amount of the fuel consumed in fact and calculates real fuel efficiency as fuel consumption per unit time from this. Comparing this real fuel efficiency to predetermined target fuel efficiency, when the real fuel efficiency is lower than this target fuel efficiency, the operation of the construction machine is switched to the energy saving operation.

Thus, conventionally, the construction machine can perform the energy saving operation. However, according to the construction machine described in the patent document 1, the operation is switched to the energy saving operation after the fuel efficiency is lowered, namely, the operation is not switched to the energy saving operation unless the fuel efficiency is lowered. In the meantime, when the fuel efficiency is lowered in actual use of the construction machine, the operation is automatically shifted to the energy saving operation. In the meantime, according to the construction machine, it is possible to enhance the fuel efficiency by traveling or performing the operation with a low number of revolutions of an engine and by stopping wasteful idling. In other words, enhancement of the fuel efficiency or the like can be achieved by devising the driving and operation by an operator of the construction machine. However, upon traveling and performing the operation, the operator tends to ignore necessity of enhancement of the fuel efficiency, so that it is perceived that the operator is not conscious of the operation for enhancing the fuel efficiency. In other words, the operation for enhancing the fuel efficiency is only described in an instruction booklet and an operator's manual separately, so that under the current state, the operator is not conscious of the operation and the driving for enhancing the fuel efficiency when he or she performs the operation in an operator's cabin.

SUMMARY OF THE INVENTION

The present invention has been made taking the foregoing problems into consideration and an object of which is to provide a construction machine capable of encouraging an operator to perform the driving and the operation for enhancing fuel efficiency.

Therefore, a construction machine according to the first aspect of the invention may include information providing means 30 to notify an operator of information such as an operation and/or an operational method or the like to enhance the fuel efficiency.

According to the construction machine of the first aspect of the invention, it is possible to notify the operator of the information such as the operation or the like to enhance the fuel efficiency by means of the information providing means 30.

According to a second aspect of the invention, the construction machine may provide the information by monitor display on a monitor screen 26 that is disposed in an operator's cabin 11.

According to the construction machine of the second aspect of the invention, the operator in the operator's cabin 11 can know the information such as the operation or the like to enhance the fuel efficiency from the monitor display on the monitor screen 26 in this operator's cabin 11. In other words, the operator can know the information visually.

According to a third aspect of the invention, the construction machine can provide the information to the operator by voice attention by means of a voice generator.

According to the construction machine of the third aspect of the invention, the operator can know the information such as the operation or the like to enhance the fuel efficiency by the voice attention by means of the voice generator. In other words, without watching the monitor screen 26 or the like, the operator can grasp the above-described each information by auditory sense while checking the forward from a forward window 23.

According to a fourth aspect of the invention, the construction machine may transmit the above-described information from the outside of the machine to notify the operator of this information.

According to the construction machine of the fourth aspect of the invention, the operator located in the operator's cabin 11 can be notified of the information such as the operation or the like to enhance the fuel efficiency from the outside of the machine, namely, from the operator (an administrator of the machine) located in a different place from the operator's cabin 11. In this case, since the information is transmitted from the outside, it is possible to arbitrarily set timing to transmit this information to the operator's cabin 11 and further, it is possible to arbitrarily change the content of the information to be transmitted.

According to a fifth aspect of the invention, the construction machine may provide the information upon starting of an engine.

According to the construction machine of the fifth aspect of the invention, by starting the engine, it is possible to notify the operator of the information by the monitor display and the voice attention or the like.

According to the construction machine of a sixth aspect of the invention, the information providing means 30 can switch between an ON state to provide the information and an OFF state not to provide the information.

According to the construction machine of the sixth aspect of the invention, since the information providing means 30 can switch between the ON state to provide the information and the OFF state not to provide the information, when the operator does not consider enhancement of the fuel efficiency or the operator takes the operation for enhancement of the fuel efficiency into consideration, namely, when the operator does not need to obtain the information, the information providing means 30 can be switched to the OFF state. In addition, when the operator needs to obtain the information, the information providing means 30 can be switched to the ON state.

According to a seventh aspect of the invention, the construction machine may include a lock lever 21 having a function to lock the operation of an implement 4 or the like, and detecting that this lock lever 21 is operated to the lock side, the construction machine provides the information such as the operation or the like to enhance the fuel efficiency upon idling.

According to the seventh aspect of the invention, since the construction machine can provide the information such as the operation or the like to enhance the fuel efficiency upon idling when the lock lever 21 is operated to the lock side, upon idling in the locked state, for example, it is possible to instruct the operator to decrease the number of revolutions of an engine 40 or to stop idling.

According to an eighth aspect of the invention, the construction machine can detect that operating machine levers 19 and 20 are positioned at a neutral position and that the number of revolutions of the engine 40 is the number of idling revolution, and then, when this number of idling revolution is a predetermined time and over, the present construction machine may provide the information such as the operation or the like to enhance the fuel efficiency upon idling.

According to the construction machine of the eighth aspect of the invention, when this number of idling revolution takes a predetermined time and over with the operating machine levers 19 and 20 located at a neutral position, the operator can obtain the information such as the operation or the like to enhance the fuel efficiency upon idling. Therefore, the operator can perform the operation to achieve enhancement of the fuel efficiency and wasteful use of the fuel for a long period of time can be prevented.

According to the construction machine of the first aspect, the operator can know the information such as the operation and/or the operational method or the like to enhance the fuel efficiency, upon traveling and performing the operation (for example, upon drilling or the like by using the implement), the operator can try to drive the construction machine or to perform the operation for enhancement of the fuel efficiency so as to contribute to achievement of energy conservation. Further, since it is no need to provide detecting means and control means or the like for enhancement of the fuel efficiency, reduction of a cost can be achieved.

According to the construction machine of the second aspect, the operator in the operator's cabin can know the information such as the operation or the like to enhance the fuel efficiency visually, so that he or she can try to drive the construction machine or to perform the operation for enhancement of the fuel efficiency.

According to the construction machine of the third aspect, the operator can grasp the information such as the operation or the like to enhance the fuel efficiency by auditory sense while checking the forward from a forward window without watching the monitor screen or the like, so that he or she can concentrate on the driving and the operation so as to perform the stable operation.

According to the construction machine of the fourth aspect, it is possible to encourage the operator located in the operator's cabin to perform the operation or the like for enhancing the fuel efficiency from the operator (the administrator of the machine) located in the different place from the operator's cabin. In other words, in the case that the operator in the operator's cabin is not conscious of such operation (the operation for enhancing the fuel efficiency) when he or she performs the operation, it is possible to awaken this operator to the fact that he or she should perform the operation for enhancing the fuel efficiency so as to reliably achieve the energy saving. In addition, it is possible to arbitrarily set timing to transmit this information to the operator's cabin 11 and further, it is possible to arbitrarily change the content of the information to be transmitted, so that the information corresponding to the operation performed by the operator in the operator's cabin or the operation to be performed from now can be noticed to this operator, and this makes it easy for the operator to enhance the fuel efficiency.

According to the construction machine of the fifth aspect, by starting the engine, it is possible to notify the operator of the information by the monitor display and the voice attention or the like, so that the operator can reliably grasp the above-described information upon traveling and performing the operation.

According to the construction machine of the sixth aspect, when the operator does not consider enhancement of the fuel efficiency or the operator takes the operation for enhancement of the fuel efficiency into consideration, namely, when the operator does not need to obtain the information, the information providing means can be switched to the OFF state. Therefore, the information is not displayed by the monitor display and the voice attention, and this makes it possible for the operator to concentrate on the driving operation and the operation of the implement. In addition, in the case that the operator wants to perform the operation for enhancement of the fuel efficiency, if the information providing means is in the ON state, it is possible to display the information for enhancement of the fuel efficiency by the monitor display and the voice attention or the like, and this results in that the operator tries to perform driving and operation to enhance the fuel efficiency.

According to the construction machine of the seventh aspect, upon idling in the locked state, for example, it is possible to instruct the operator to decrease the number of revolutions of an engine or to stop idling. Therefore, upon such idling, by performing the operation to save fuel, the energy saving can be achieved.

According to the construction machine of the length aspect, when the operating machine lever is located in the neutral position, by preventing idling for a long period of time causing wasteful use of the fuel, it is possible to achieve energy saving.

DESCRIPTION OF THE PREFERRED EMBODIMENTS

Figure 2:
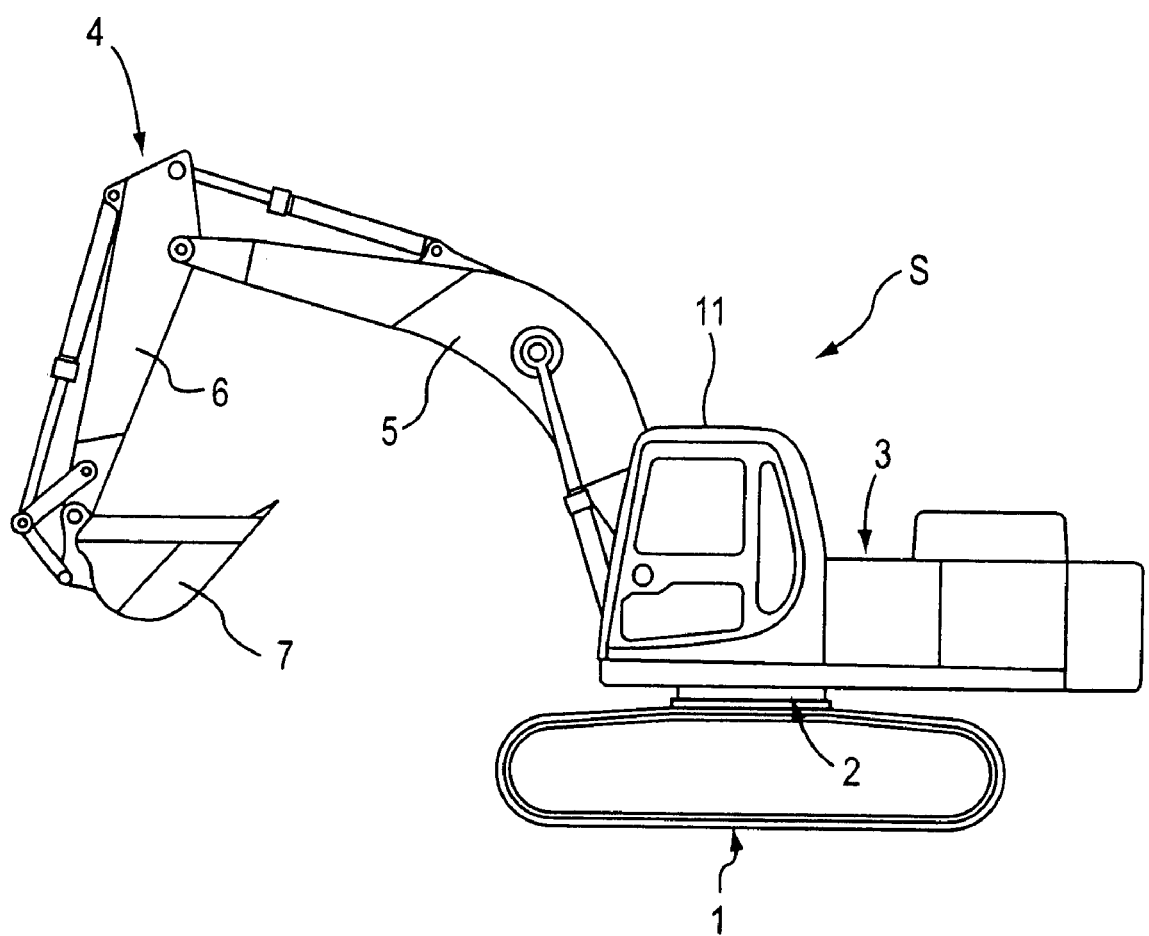
FIG. 2 is an entire simple view showing the construction machine.

In the next place, with reference to the drawings, the specific embodiments of the present invention will be described in detail below. FIG. 2 is a simple view of this construction machine S. This construction machine S is a hydraulic excavator and is provided with a lower traveling body 1, and an upper pivoting body 3 to be pivotally fit above the lower traveling body 1 via a pivoting mechanism 2. The implement 4 is continued to the upper pivoting body 3. This implement 4 is provided with a boom 5 of which base is swingably coupled to the upper pivoting body 3, an arm 6 that is swingably coupled to the front end of the boom 5, and a bucket 7 that is swingably coupled to the front end of the arm 6. In addition, the upper pivoting body 3 is provided with an operator's cabin 11 or the like.

Figure 1:
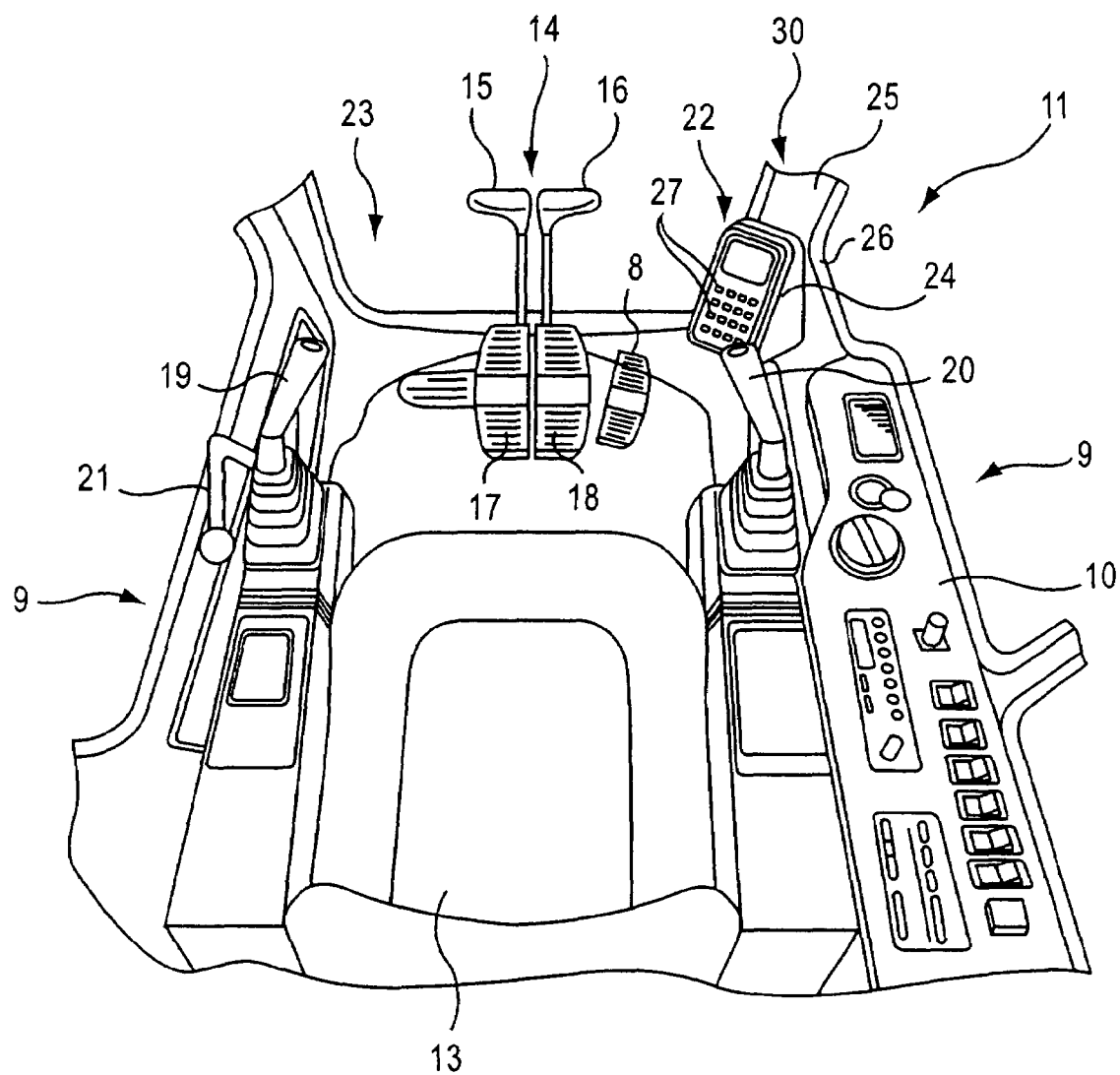
FIG. 1 is a substantial part perspective view showing an embodiment of a construction machine according to the present invention.

As shown in FIG. 1, in the operator's cabin 11 of the upper pivoting body 3, an operator's seat 13 is disposed at its center part and traveling operation means 14 is disposed in front of this operator's seat 13. This traveling operation means 14 is provided with traveling levers 15 and 16, and traveling pedals 17 and 18 to swing integrally with the traveling levers 15 and 16 respectively. In this case, if the traveling levers 15 and 16 are pushed forward, the lower traveling body 1 moves forward, and if the traveling levers 15 and 16 are pulled backward, the lower traveling body 1 moves backward. In the meantime, in the vicinity of the traveling operation means 14, a pedal for attachment 8 is disposed, and further, at the side of one side window 9, an instrument panel 10 is located.

In addition, at the side of the operator's seal 13, the operating machine levers 19 and 20 are arranged respectively. These operating machine levers 19 and 20 serve to perform seesaw movement of the boom 5, rotation of the arm 6 and the bucket 7, and the pivoting operation of the upper pivoting body 3. Further, in the vicinity of one operating machine lever 19, the lock lever 21 is provided. In this case, the lock lever 21 serves to stop the operation of the implement 4, pivoting of the upper pivoting body 3, and traveling of the lower traveling body 1 or the like. In other words, by performing the pulling-up operation of the lock lever 21, movement of the implement 4 or the like can be locked (regulated), and in this state, even if the operating machine levers 19 and 20 or the like are operated, it is possible to prevent the implement 4 or the like from operating.

In addition, in the operator's cabin 11 of this construction machine S, a monitor device 22 is provided to display the engine state or the like. In this case, the engine state means a temperature of engine cooling water, a temperature of engine oil, and a fuel remaining quantity or the like. In the meantime, this monitor device 22 is arranged at the lower part of a vertical frame 25 partitioning a front window 23 of the operator's cabin 11 and one side window 9, and at a front surface of an external case 24, a monitor screen 26 and operation push buttons 27 are arranged. Further, this monitor screen 26 is made of, for example, a liquid crystal panel.

This monitor device 22 may display the information such as the operation and/or the operational method or the like to enhance the fuel efficiency on its monitor screen 26 other than the above-described engine state and the monitor device 22 forms the information providing means 30. Here, the operation to enhance the fuel efficiency is, for example, the operation of driving while decreasing the number of revolutions of the engine of the construction machine upon traveling the implement or the like, and the operational method to enhance the fuel efficiency is, for example, a method to locate the construction machine S in the vicinity of a dump truck T or the like and to load sediment on this dump truck T by the construction machine S or the like.

Figure 3:
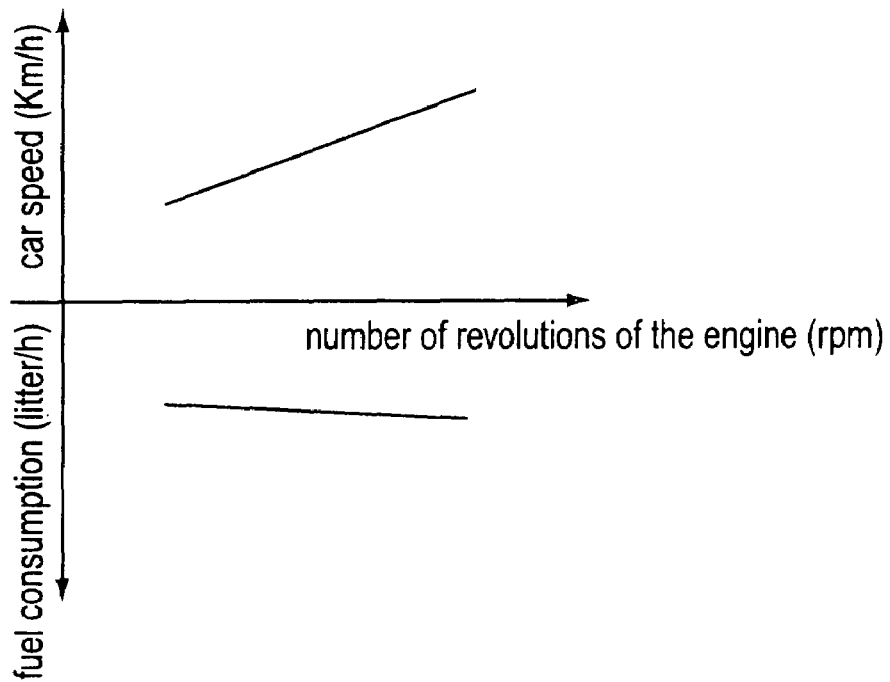
FIG. 3 is a graph showing a relationship between the number of revolutions of an engine, a car speed, and fuel consumption.
Figure 4:
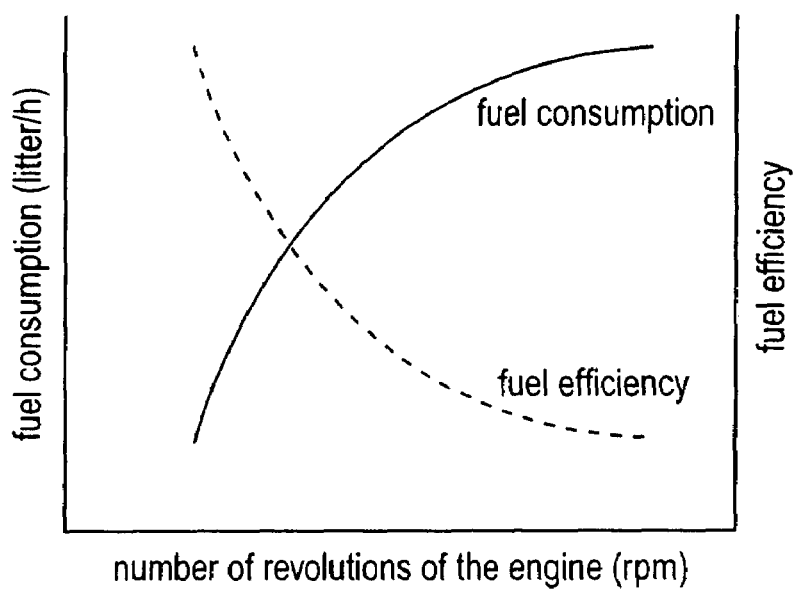
FIG. 4 is a graph showing a relationship between the number of revolutions of an engine, fuel consumption, and fuel efficiency.

FIG. 3 shows a relationship between the number of revolutions of the engine (rpm), fuel consumption (litter/h), and a car speed (Km/h). In other words, if the number of revolutions of the engine is increased, the car speed is lowered, however, the fuel efficiency is enhanced. In addition, by decreasing the number of revolutions of the engine, the fuel efficiency (a traveling distance per litter of the fuel) is improved, so that the driving with high efficiency is possible. In this case, for example, when traveling on a flat road by using the construction machine (the hydraulic excavator), if the number of revolutions of the engine is decreased from a full throttle state, the car speed is lowered, however, the fuel consumption can be decreased more than this, and as a result, the power efficiency is improved. Therefore, as the operation to enhance the fuel efficiency, for example, "by traveling while decreasing the number of revolutions of the engine, to save fuel" or the like is displayed on the monitor screen 26. In addition, also in the case of performing the operation to excavate the sediment by using the implement 4, if the engine 40 (refer to FIG. 4) has the highest number of revolution, the operation speed is fast and the output becomes highest, however, the fuel consumption is increased. On the contrary, if the number of revolutions of the engine 40 is decreased, the operation speed and the output are decreased, however, the fuel consumption is also decreased and the fuel efficiency is enhanced. In this case, for example, using the construction machine (the hydraulic excavator) and defining a pivoting angle α (refer to FIG. 5) as 90 degrees, if the sediment is loaded five times and the number of revolutions of the engine is decreased from the full throttle state, the operation quantity is decreased, however, the fuel consumption is decreased more than this and as a result, the fuel efficiency is enhanced. Therefore, as the operation to enhance the fuel efficiency, for example, "by traveling while decreasing the number of revolutions of the engine, to save fuel" or the like is displayed on the monitor screen 26. Further, FIG. 4 shows a relationship between the number of revolutions of the engine (rpm), fuel consumption (litter/h), and fuel efficiency (ton/litter). In other words, if the number of revolutions of the engine is decreased, the fuel consumption is decreased and the fuel efficiency is enhanced. Therefore, as the operation to enhance the fuel efficiency, for example, "by decreasing the number of high idle revolution of the engine, fuel consumption is decreased and fuel efficiency is enhanced" or the like is displayed on the monitor screen 26.

Figure 5:
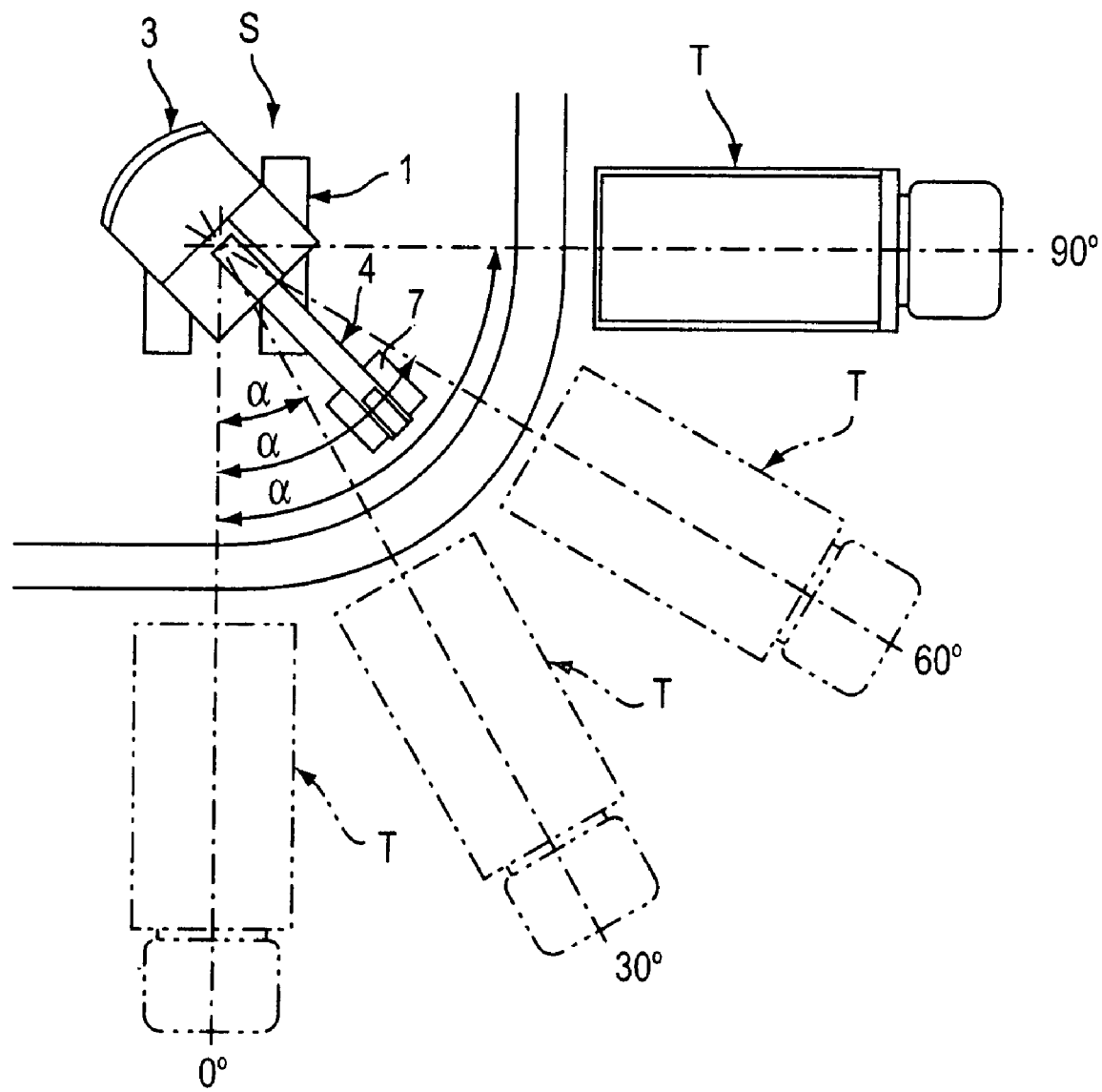
FIG. 5 is a simple plane view showing the operation state of the construction machine.
Figure 6:
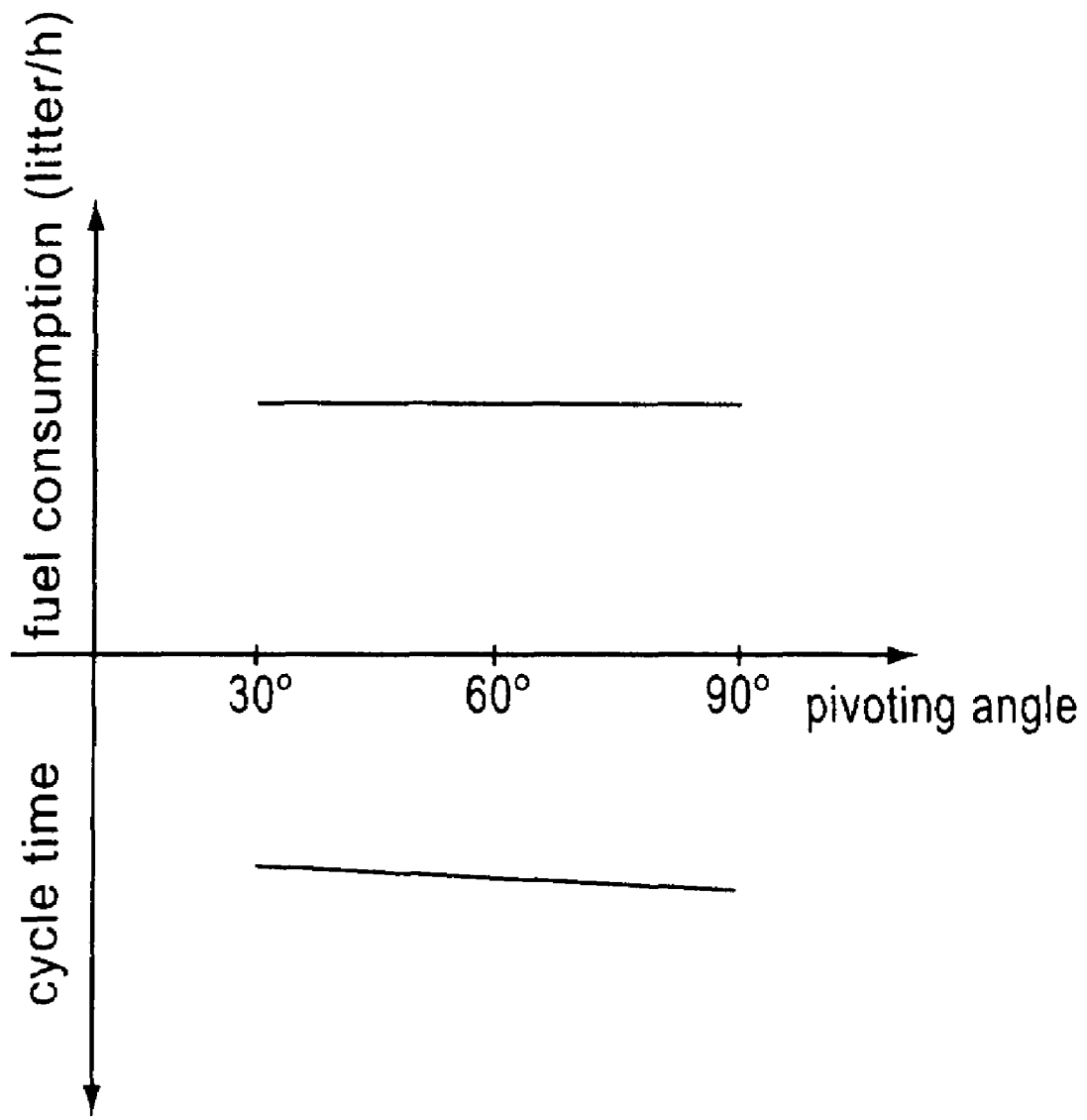
FIG. 6 is a graph showing a relationship between fuel consumption and a cycle time in the operation state shown in FIG. 5.

In addition, as shown in FIG. 5, in the operation to arrange the dump truck T in the vicinity of this construction machine (a loading machine) S and loading the sediment on the dump truck T by this construction machine S, depending on the pivoting angle α of the implement 4, the cycle time or the like is different. In other words, as being obvious from a relation between the pivoting angle α, the fuel consumption (litter/h), and the cycle time (second) shown in FIG. 6, the fuel consumption is hardly changed, however, if the pivoting angle α is decreased, the cycle time is decreased and the fuel efficiency is enhanced. In this case, for example, comparing the case that the pivoting angle α is 90 degrees upon using the construction machine (the hydraulic excavator) and the case that the pivoting angle α is 30 degrees upon using the construction machine (the hydraulic excavator), the cycle time is shortened and the fuel efficiency is increased in the case of 30 degrees than the case of 90 degrees, however, the operation quantity is increased more than these, and as a result, the fuel efficiency is enhanced. Therefore, as the operational method to enhance the fuel efficiency, for example, "park a dump truck as close to a loading machine" or the like is displayed on the monitor screen 26.

Figure 7:
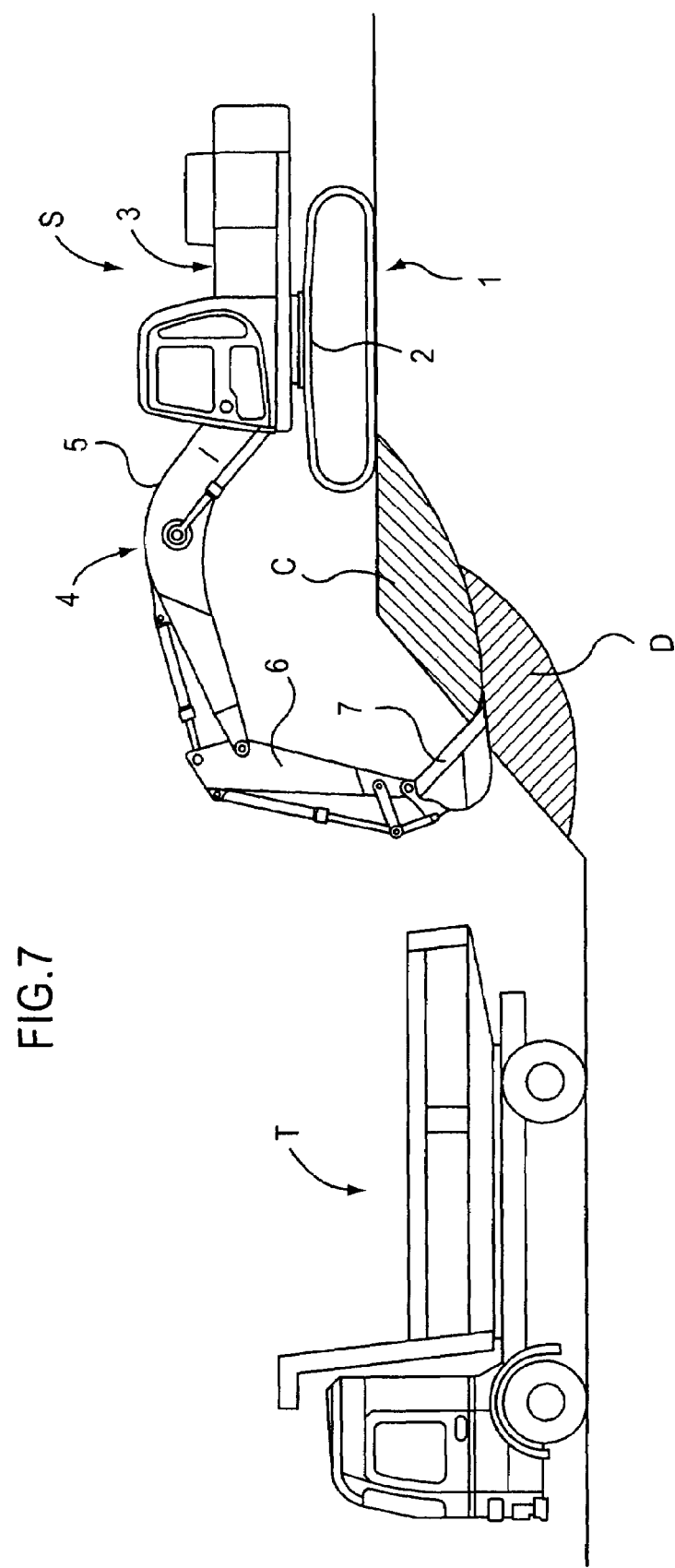
FIG. 7 is a simple view showing excavating operation in consideration of enhancement of fuel efficiency of the construction machine.
Figure 8:
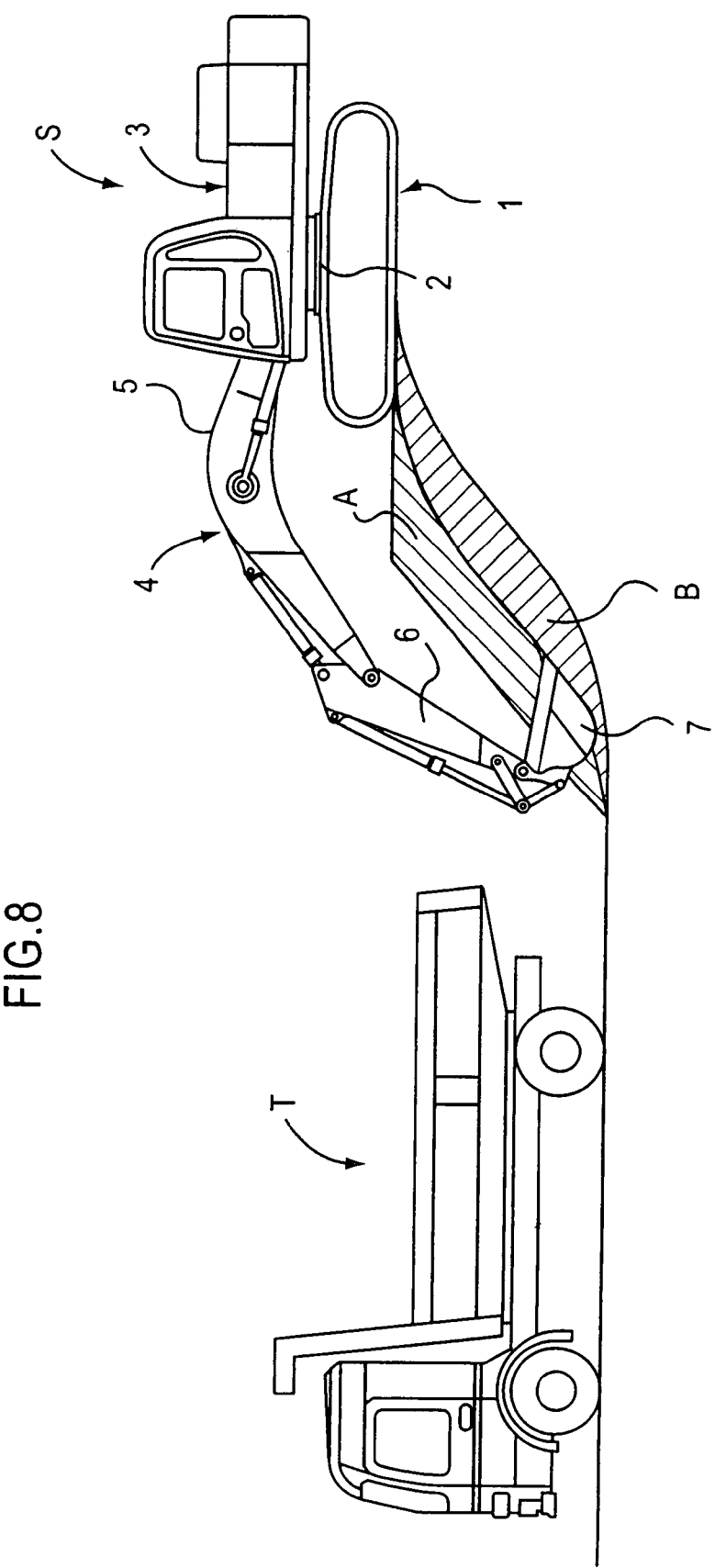
FIG. 8 is a simple view showing excavating operation without consideration of enhancement of fuel efficiency of the construction machine.

Further, in the case of performing the excavating operation, the fuel efficiency or the like is different in the operation to scoop the sediment from a lower position as shown in FIG. 8 and in the operation to scoop the sediment at the lower position after scooping the sediment at a higher position as shown in FIG. 7. In other words, according to the method as shown in FIG. 8, the sediment in a B range is scooped after scooping the sediment in a range A, so that the moving amounts of the arm 6 and the boom 5 are increased, the fuel consumption is increased, and the cycle time is made longer. On the contrary, according to the method as shown in FIG. 7, at first, the sediment in a C range is scooped, and then, the sediment in a D range is scooped, so that the moving amounts of the arm 6 and the boom 5 are decreased, the quantity of work and the fuel efficiency can be enhanced, and the cycle time is made shorter. Therefore, as the operational method to enhance the fuel efficiency, for example, "by driving when a excavating position is high, the fuel efficiency is enhanced" or the like is displayed on the monitor screen 26.

In the meantime, since traveling and various operations are generally not performed during idling, the idling should be made a bare essential minimum value. Therefore, as the operation to enhance the fuel efficiency, for example, "stop idling" or the like is displayed on the monitor screen 26. Further, the implement 4 is operated by a hydraulic pressure and if a frequency of a hydraulic pressure relief of this hydraulic circuit is increased, the fuel consumption is increased. Therefore, as the operational method to enhance the fuel efficiency, for example, "refraining from the unreasonable lever operation in the hydraulic pressure relief, the fuel consumption is saved" or the like is displayed on the monitor screen 26.

The above-described various kinds of information may be provided before start of the operation or after closing of the operation. For example, the information may be displayed from a starting time of the engine 40 during the operation in a warm air, the information may be constantly displayed, or the information may be displayed before operating excavating from a time when the operator arrives at a working scene. In this way, according to the construction machine structured as described above, since the operator can visually know the information such as the operation and/or the operational method or the like to enhance the fuel efficiency from the display on the monitor screen 26 during the traveling and performing various operations, upon traveling and performing the operation (for example, upon the excavating operation by using the implement), the operator can try to drive the construction machine or to perform the operation for enhancement of the fuel efficiency so as to contribute to achievement of energy conservation. In addition, as the above-described embodiments, the information may be provided by the display on the monitor screen 26 of the monitor device 22 that is conventionally loaded on such kind of construction machine or by the display of the operation or the like to enhance the fuel efficiency on a monitor for providing the information that is separately arranged and is different from the conventional monitor device 22.

In the meantime, according to this construction machine, as described above, the lock lever 21 having the function to lock the operation of the implement 4 or the like is provided, and in this case, detecting that the lock lever 21 is operated to the lock side, it is possible to provide the information such as the operation or the like to enhance the fuel efficiency upon idling. Further, when the operating machine levers 19 and 20 are in a neutral position, detecting this neutral poison and detecting a time upon idling as the idle revolution number at the neutral position, if the idling time in this neutral state is a predetermined time and over, it is possible to provide the information such as the operation to enhance the fuel efficiency upon idling.

Figure 9:
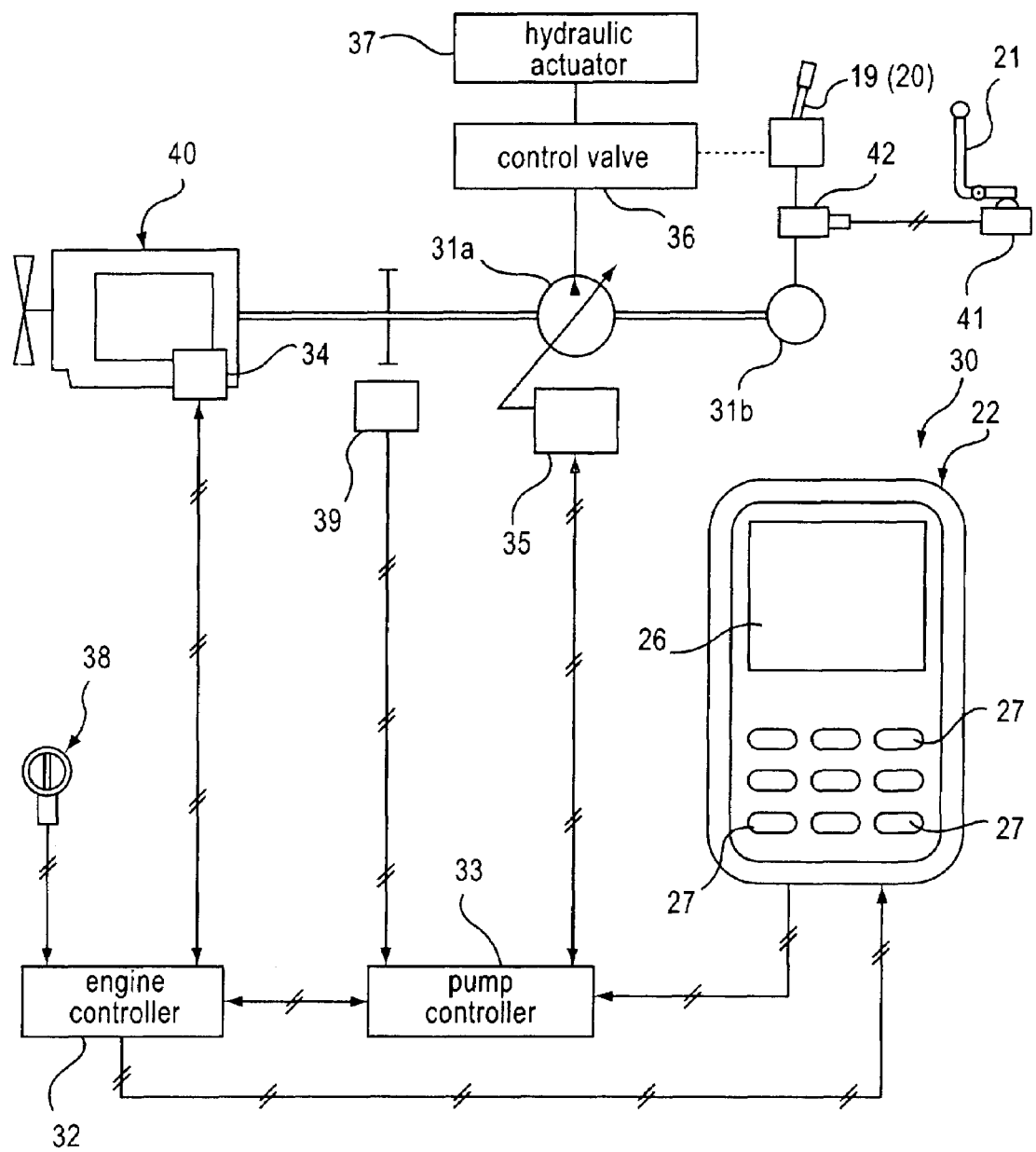
FIG. 9 is a simple view showing a control system of the construction machine.

As shown in FIG. 9, the control system of the construction machine in this case has a first pump 31a and a second pump 31b as a hydraulic pump 31, and has an engine controller 32 and a pump controller 33 as a controller. In this FIG. 9, a reference numeral 34 denotes a governor motor and a reference numeral 35 denotes a swash plate driving device of the first pump 31a, which is driven by the instruction from the pump controller 33 and can change a tilt angle of the swash plate of the firs hydraulic pump 31a. Then, an actuator (hydraulic actuator) 37 is connected to the first pump 31a via a control valve 36. As the actuator 37, a cylinder for a boom, a cylinder for an arm, a cylinder for a bucket, a hydraulic motor for pivoting, and a hydraulic motor for traveling or the like are available. In addition, the operating machine lever 19 (20) are connected to the second pump 31b via a valve (a solenoid valve) 42. In this case, setting the number of revolutions of the engine governor by a fuel dial 38, on the basis of the actual number of revolution of the engine 40 that is detected by the revolution sensor 39, the control system may control a torque of best matching at each output point of the engine 40 so as to be absorbed by the hydraulic pumps 1a and 1b.

Figure 10:
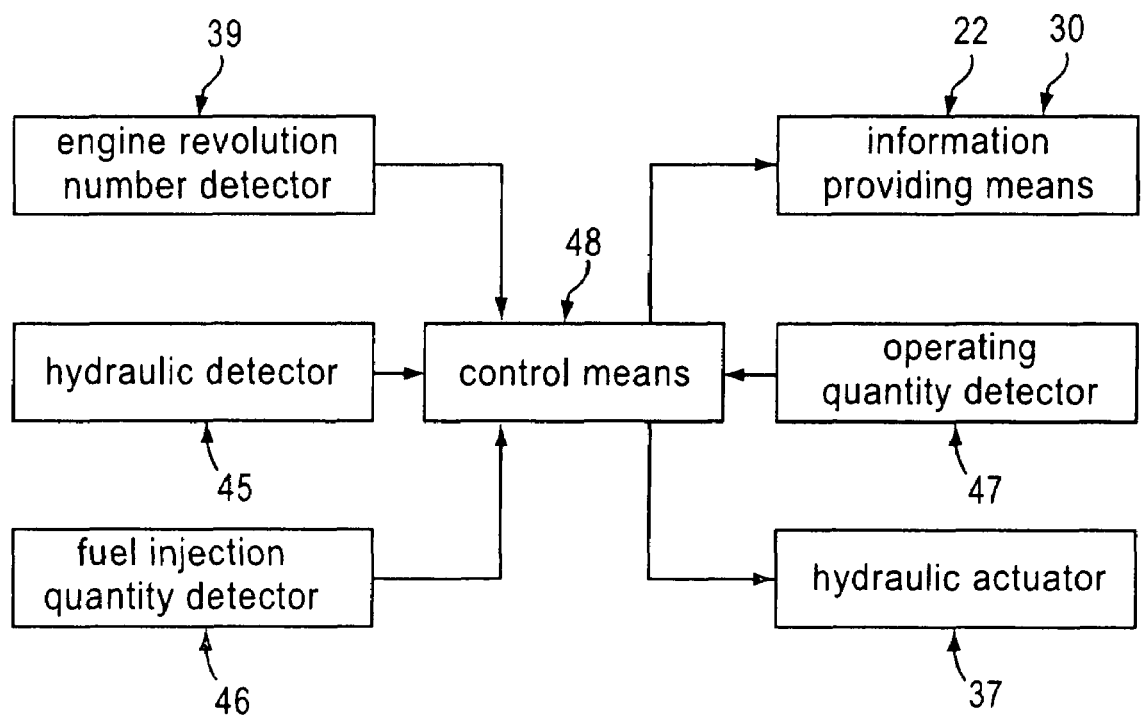
FIG. 10 is a simple circuit diagram of the control system of the construction machine.

Then, a PPC lock switch 41 is connected to the lock lever 21, and when this lock lever 21 is operated to the locking side, this switch 41 may detect this operation and a signal may be transmitted from this switch 41 to a valve (a solenoid valve) 42, and thereby, it is possible to stop the functions such as the operation of the implement 4, pivoting of the upper pivoting body 3, and traveling of the lower traveling body 1 or the like. In this case, the engine 40 has the idle revolution number and goes into an idling state. In other words, as shown in FIG. 10, a control circuit of this control system is provided with a hydraulic detector 45 configured by the PPC lock switch 41 or the like, an engine revolution number detector (revolution sensor) 39, a fuel injection quantity detector 46, an operating quantity detector 47, control means 48 to which the data from those detectors 45, 39, 46 and 47 are inputted or the like, and the control means 48 may output various instructions to the information providing means 30 and the hydraulic actuator 37. Therefore, when detecting that the lock lever 21 is operated to the lock side, on the basis of this detection, the information such as the operation or the like to enhance the fuel efficiency upon idling is provided. In other words, as the operation to enhance the fuel efficiency, for example, "stop idling", "decrease the number of revolutions of the engine upon idling" or the like can be displayed on the monitor screen 26. This result in saving of the fuel upon idling or the like and the energy saving can be reliably achieved. In the meantime, on the basis of the fuel injection quantity that is detected by the fuel injection quantity detector 46, this control system can calculate the fuel consumption quantity of this construction machine. Further, according to this control system, the operating quantity detector 47 can detect the operating quantity or the like upon loading the sediment on the bucket 7. For example, the operating quantity upon loading can be obtained by detecting the loading quantity of the bucket 7 by means of a monitor camera or the like from (loading quantity×number/time), and the operating quantity upon transporting can be obtained from (loading weight× distance) or the like.

In addition, if the operator positions the operating machine levers 19 and 20 at a neutral position during operation, this control system can detect this by the PPC pressure. Therefore, in this neutral state, when the idling time of the idle revolution number is a predetermined time and over, as the operation to enhance the fuel efficiency, for example, "stop idling" or the like can be displayed on the monitor screen 26. In this case, count means such as a timer or the like is connected to the revolution sensor 39 and the number of revolutions of the engine that is detected by the revolution sensor 39 becomes the idle revolution number. Then, when this idle revolution number is continued, by measuring the continuing time of this idle revolution number, it is possible to detect if this continuing time is a predetermined time and over. Thus, when the operating machine levers 19 and 20 are positioned at a neutral position, if the idling time becomes a predetermined time and over, the operator can be provided with the information such as the operation or the like to enhance the fuel efficiency. Thereby, by preventing the idling for a long period of time causing the wasteful use of the fuel, the energy saving can be achieved. In the meantime, a predetermined time of the idle revolution number can be arbitrarily set. In this case, if the predetermined time is too short, positioning the operating machine levers 19 and 20 at a neutral position, the operator is provided with such information immediately, however, when the operator clears up the neutral state immediately, providing of such information is useless, and on the contrary, if the neutral state is continued for a long time, the idling time becomes long and the fuel efficiency becomes unfavorable. Therefore, in consideration of these, this predetermined time is preferably set as a time capable of contributing to the saving of energy if the operation to enhance the fuel efficiency is performed with the information offered.

According to other embodiment, by providing the voice generator (not illustrated) in the operator's cabin 11, the above-described information may be noticed to the operator in the operator's cabin 11 by the voice attention from this voice generator. In other words, the voice generator may generate the above-described various information by the voice that is audible to the operator in the operator's cabin 11. In this case, the voice attention of this voice generator may be displayed independently or it may be displayed together with the above-described monitor display. By the voice attention, the operator can grasp the above-described various information while checking the forward from a forward window 23, so that it is possible to prevent the driving and the operation of the construction machine from neglected. However, by the voice attention, it may be difficult to hear the information due to the noise or the like at a working scene, and in such a case, by the monitor display, the operator can notice the information. Therefore, using the voice attention together with the monitor display, it is possible to notify the operator of the information reliably.

In addition, according to still other embodiment, it is also possible to switch the ON state displaying the above-described information into the OFF state not displaying such information by the information providing means 30. In other words, for example, in the case of the monitor display, by pushing a specific button of the push buttons 27 of the monitor display 22, the ON state can be switched into the OFF state. In addition, even in the case of the voice attention, by providing a switch or the like at the voice generator, the ON state can be switched into the OFF state. Since the information providing means 30 can switch between the ON state displaying the above-described information and the OFF state not displaying such information in this way, when the operator does not consider enhancement of the fuel efficiency or the operator takes the operation for enhancement of the fuel efficiency into consideration, namely, when the operator does not need to obtain the information, the information providing means 30 can be switched to the OFF state. In this case, the information is not provided to the operator by the monitor display and the voice attention, so that the operator can concentrate on the driving and operation of the constructing machine and the operation of the implement. In addition, in the case of performing the operation to enhance the fuel efficiency, by switching the information providing means 30 into the ON state, the information to enhance the fuel efficiency can be displayed by the monitor display and the voice attention or the like, so that the operator can try to perform driving and operation to enhance the fuel efficiency.

According to still other embodiment, providing communication means, from the outside of the machine, namely from the operator (an administrator of the machine) located, in a different place from the operator's cabin 11, the above-described information (information such as the operation or the like to enhance the fuel efficiency) may be notified to the operator in the operator's cabin 11. In other words, an information transmitter at the side of the administrator of the machine is arranged, and further, a receiver (for example, a receiver provided on the monitor device 22) to receive the data from the information transmitter is arranged on the side of the driver's cabin 11 of the construction machine. Then, transmitting the information such as the operation or the like to enhance the fuel efficiency from the information transmitter to the receiver as data, the information received by the receiver is displayed on the monitor screen 26 of the monitor device 22 as the monitor display and it is displayed by the voice generator as the voice attention. If such communication means is provided, it is possible to encourage the operator located in the operator's cabin 11 to perform the operation or the like for enhancing the fuel efficiency from the operator (the administrator of the machine) located in the different place from the operator's cabin 11. In other words, in the case that the operator in the operator's cabin 11 is not conscious of such operation (the operation for enhancing the fuel efficiency) when he or she performs the operation, it is possible to awaken this operator to the fact that he or she should perform the operation for enhancing the fuel efficiency so as to reliably achieve the energy saving. In addition, since the information is provided to the operator by the transmission from the outside, it is possible to arbitrarily set timing to transmit this information to the operator's cabin 11 and further, and it is possible, to arbitrarily change the content of the information to be transmitted, so that the information corresponding to the operation performed by the operator in the operator's cabin 11 or the operation to be performed from now can be noticed to this operator, and this makes it easy for the operator to enhance the fuel efficiency.

The specific embodiments of the present invention are as described above, however, the present invention is not limited to the above-described embodiments and various modifications will become possible without departing from the scope the present invention. For example, it is preferable that the monitor display 22 is positioned at a place where the operator can observe the monitor screen 26 when he or she is seated on the driver's seat 13 to travel this construction machine or he or she uses the implement 4 to perform the operation, however, this is not limited to the position shown in FIG. 1. In addition, upon displaying the information on the monitor or by the voice attention, the information may only about the operation to enhance the fuel efficiency or it may only about the operation method to enhance the fuel efficiency, or it may about both of them. Further, a phrase of the monitor display or the like is not limited to a catch-phrase as in the above-described embodiments and it may be a short sentence such as "enhancement of the fuel efficiency" because the operator may try to perform the driving and the operation to enhance the fuel efficiency only by the word of "the fuel efficiency". In addition, in the case of monitor display, as the above-described embodiments, the display may be only composed of characters, however, together with the characters, a drawing (a picture) to grasp the information may be available and such drawing (picture) may be independently used while omitting the characters. In the meantime, the construction machine S is not limited to the hydraulic excavator and various machines such as a crane and a crushing machine or the like may be available.

What is claimed is:

1. A construction machine comprising:
   a lock lever having a function to lock an operation of an implement;
   a revolution sensor coupled to a control means;
   a detector, connected to the control means, for detecting whether said lock lever is operated to a lock side; and
   an information providing means for notifying an operator of information to enable the operator to increase fuel efficiency, the information being provided to the operator only when two conditions are detected, the two conditions being that an engine of the construction machine is idling and that said lock lever is operated to the lock side.

2. The construction machine according to claim 1, wherein said construction machine provides the information by monitor display on a monitor screen (26) that is disposed in an operator's cabin (11).

3. The construction machine according to claim 1 or 2, wherein said construction machine comprises a voice generator and provides the information to the operator by voice attention by means of said voice generator.

4. The construction machine according to claim 1 or 2, wherein said construction machine transmits the information from the outside of the machine to notify the operator of this information.

5. The construction machine according to claim 1 or 2, wherein said construction machine provides the information upon stalling of an engine.

6. The construction machine according to claim 1 or 2, wherein said information providing means (30) can switch between an ON state to provide the information and an OFF state not to provide the information.

7. The construction machine according to claim 1 or 2, wherein, upon detecting that operating machine levers are positioned at a neutral position and that a number of revolutions of an engine is the number of idling revolutions, then, after this number of idling revolutions extends longer than a predetermined time, said construction machine provides the information to the operator to enhance the fuel efficiency upon idling.

8. The construction machine according to claim 1, wherein the lock lever is operated by a pulling-up operation.

9. The construction machine according to claim 1, wherein the information to enable the operator to increase fuel efficiency when an engine of die construction machine is idling is a command.

10. The construction machine according to claim 2, wherein the detector comprises a switch.

11. The construction machine according to claim 2, wherein the switch actuates a solenoid valve.

* * * * *